United States Patent [19]

Kondo et al.

[11] 3,937,872

[45] Feb. 10, 1976

[54] INTERNAL TEST METHOD FOR FACSIMILE TRANSCEIVER

[75] Inventors: Mitsuru Kondo; Toshihiko Misawa, both of Tokyo, Japan

[73] Assignee: Kabushiki Kaisha Ricoh, Tokyo, Japan

[22] Filed: May 1, 1974

[21] Appl. No.: 465,793

[30] Foreign Application Priority Data

May 8, 1973  Japan.............................. 48-50951

[52] U.S. Cl.................... 178/6; 178/6.6 R; 178/7.1; 179/DIG. 4
[51] Int. Cl.².................... H04N 1/06; H04N 1/32
[58] Field of Search ............ 178/7.1, DIG. 4, 6, 6.6

[56] References Cited

UNITED STATES PATENTS 3,598,910   8/1971   Johnston ......................... 178/6.6 R Primary Examiner—Benedict V. Safourek
Assistant Examiner—Edward L. Coles
Attorney, Agent, or Firm—Frank J. Jordan

[57] ABSTRACT

The transmitting and receiving sections are both energized, and the output of the transmitting section is connected to the input of the receiving section. The intensity of the transmitting section light source is varied, as by opening and closing a switch, and if the output of the receiving section is accurate in response to the light source variation, the transmitting and receiving sections are judged to be operating normally.

10 Claims, 3 Drawing Figures

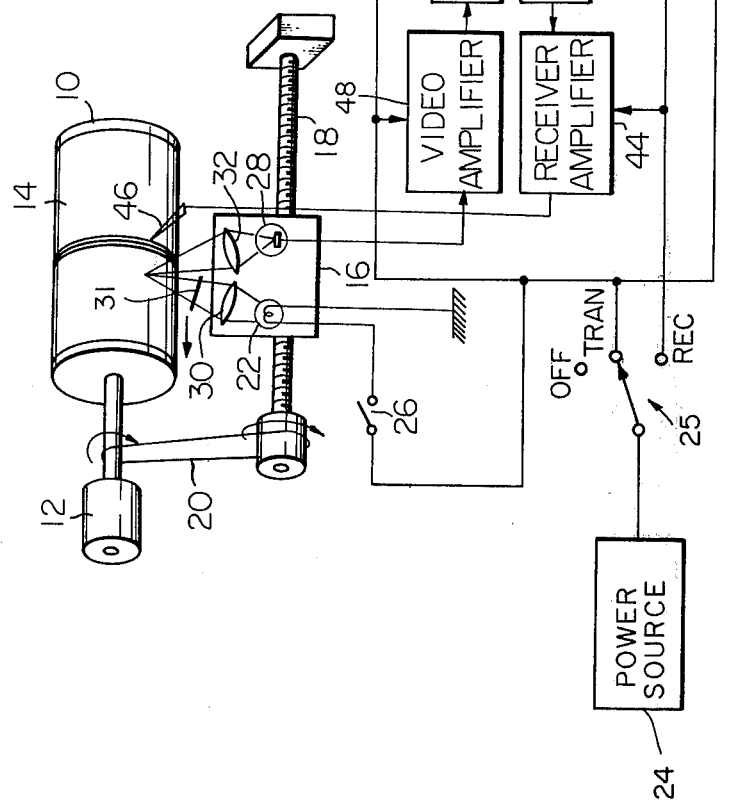
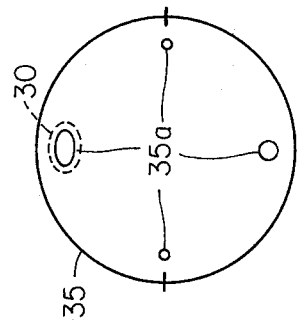
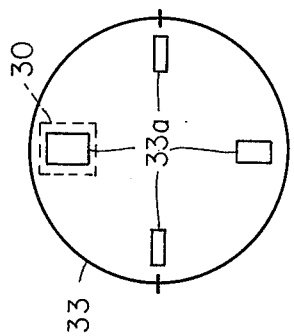
FIG. 1
FIG. 2
FIG. 3

INTERNAL TEST METHOD FOR FACSIMILE TRANSCEIVER

The present invention relates to an internal test method for a facsimile transceiver.

A prior art method of testing a facsimile transceiver involves scanning a test pattern on a test sheet and reproducing the test pattern, and the operation of the transmitting and receiving units of the transceiver is evaluated on the basis of the accuracy of the reproduction of the test pattern. This method, although generally satisfactory, has the drawbacks that a test sheet having a high resolution test pattern is required, the method requires a substantially long period of time for completion, and the cost of performing the test is relatively high.

It is therefore an important object of the present invention to provide an internal testing method for a facsimile transceiver which does not require a supplementary test sheet having a test pattern.

It is another important object of the present invention to provide an internal testing method for a facsimile transceiver which can be performed quickly and at low cost.

The above and other objects, features and advantages of the present invention will become clear from the following detailed description taken with the accompanying drawings, in which:

FIG. 1 is a schematic view, partly in perspective, of a facsimile transceiver embodying the method of the invention;

FIG. 2 is a plan view of a rotatable mechanical member for varying the intensity of a light source of the transceiver; and FIG. 3 is similar to FIG. 2 but shows another rotatable mechanical member.

In FIG. 1, a scanning drum 10 is rotated in the direction of an arrow by a motor 12 and carries a sheet of copy 14. A scanning head 16 is moved parallel to the longitudinal axis of the drum 10 by a lead screw 18 rotated in synchronization with the drum 10 through a belt 20. The scanning head 16 carries a light source 22 arranged to illuminate a point on the copy 14, which is energized by an electrical power source 24 such as a battery through a power switch 25 and a switch 26. A converging lens 30 is arranged to focus light from the light source 22 onto the point on the copy 14, and a converging lens 32 focusses an image of the point on the copy 14 onto a photosensitive element such as a photocell 28. The lens 32 and photocell 28 constitute the first elements of the transceiver transmitting section, and the output of the photocell 28 is fed through a video amplifier 34 to a modulator 36. The modulator 36 uses the amplified signal from the photocell 28 to modulate a carrier wave for transmission using a convenient modulation method such as AM, FM and the like at a convenient frequency. The output of the modulator 36 is applied through an output coupler 38 and a transmission line 48 to a transmitting antenna (not shown) for transmission.

The receiving section of the transceiver comprises an input coupler 40 which receives a transmitted signal through a transmission line 50 from a receiving antenna (not shown), and feeds the same through a demodulator 42, and a receiver amplifier 44 to a recording needle 46 which reproduces the transmitted original document on the copy 14. This type of facsimile transceiver is well known in the art, and a more detailed description thereof will be omitted.

The power switch 25 comprises a movable contact (no numeral) connected to the power source 24 which is engagable with fixed contacts OFF, TRAN and REC. The contact OFF is unconnected. The contact TRAN is connected to the energizing power inputs (not designated) of the video amplifier 34, modulator 36 and output coupler 38. The contact TRAN is also connected through the switch 26 to the lights source 22. The contact REC is connected to the energizing power inputs of the receiver amplifier 44, modulator 42 and input coupler 40.

When the movable contact of the power switch 25 engages with the contact OFF, the transceiver is completely de-energized. For normal transmission, the movable contact of the power switch 25 is engaged with the contact TRAN to energize the video amplifier 34, modulator 36 and output coupler 38. The switch is also closed to energize the light source 22. For normal reception, the movable contact of the power switch 25 is engaged with the contact REC to energize the receiver amplifier 44, demodulator 42 and input coupler 40.

A test switch 52 has contacts 52a to 52i. The contacts 52a, 52f and 52g are movable, are ganged together for unitary operation and are connected to the output of the output coupler 38, the input of the input coupler 40 and the contact REC of the power switch 25 respectively. The contacts 52b and 52d are fixed and are connected to the transmission line 48 and 50 respectively. The contacts 52c and 52e are fixed and are connected together. The contact 52i is fixed and is unconnected. The contact 52h is fixed and is connected to the contact TRAN of the power switch 25.

With the switch 52 in its test position as shown, the output of the output coupler 38 is connected to the input of the input coupler 40 through the contacts 52a, 52c, 52e and 52f. The contacts REC and TRAN of the power switch 25 are connected together through the contacts 52g and 52h of the switch 52 so that the power source 24 will be connected to the video amplifier 34, modulator 36, output coupler 38, input coupler 40, demodulator 42 and receiver amplifier 44 when the movable contact of the power switch 25 is engaged with either of the contacts REC and TRAN. When the switch 52 is changed to its normal position, the movable contacts 52a, 52f and 52g will engage with the fixed contacts 52b, 52d and 52i respectively to connect the output coupler 38 to the transmission line 48, the input coupler 40 to the transmission line 50 and disconnect the contacts REC and TRAN of the power switch 25 from each other.

In a method according to the present invention, the switch 52 is in the test position shown with the output of the coupler 38 connected to the input of the coupler 40 therethrough, and both the transmitting and receiving sections are energized. As the drum 10 and the lead screw 18 are rotated by the motor 12 in the directions shown by arrows, the scanning head 16 will move from left to right as viewed in the drawing so that the locus of the point on the copy 14 illuminated by the light source 22 and lens 30 is helical. In practice, however, the lead of the lead screw 18 compared to the length of the drum 10 is quite small in order to provide many lines along the height of the copy 14 to enable adequate resolution, and the helical pattern produced by the light source 22 and lens 30 on the copy 14 would appear as parallel horizontal lines if the copy 14 were removed from the drum 10. The same holds true if a constant signal indicating a dark area were fed to the recording needle 46 for reproduction on the copy 14.

Based on this phenomenon, it will be assumed that the switch 26 is open. Since the portion of the copy 14 being scanned by the transmitting section is not illuminated and the output of the transmitting section is being fed back into the receiving section, a dark helix (appearing as parallel horizontal lines spaced close together) will be produced on the portion of the copy 14 being traced by the recording needle 46, giving the visual impression of a completely dark copy 14. If, however, the switch 26 is closed, the portion of the copy 14 being scanned by the transmitting section will be illuminated by the light source 22, and the result will be that the recording needle 16 will be inoperative and the portion of the copy 14 being traced by the recording needle 46 will appear white.

In the case of a test according to the present invention, the switch 26 is manually and intermittently opened and closed to produce irregular parallel lines or streaks on the copy 14. If, for example, the transceiver is operating normally and the switch 26 is closed for a period of time and suddenly opened, a black line will begin to be drawn by the recording needle 46 on the copy 14 immediately as the switch 26 is opened. When the switch 26 is again closed, tracing of the line will abruptly cease.

If, however, the transceiver is operating abnormally, there may be no changes produced when the switch 26 is intermittently opened and closed. If there is an abnormal time delay in the transmitting and/or receiving sections, a black line may begin to appear at a time after the switch 26 is suddenly opened and vice versa. In this manner, the transceiver operator can easily, quickly and inexpensively evaluate the operation of both the transmitting and receiving sections of the transceiver without the use of a supplementary test sheet having a high resolution test pattern provided thereon.

Although not shown, the switch 26 may be replaced by a rheostat to continuously vary the intensity of the light source 22 rather than in two discrete states. The same effect as the switch 26 may be obtained by a shutter 31 movable between the light source 22 and the lens 30 or between the lens 30 and the copy 14 as shown. The same effect as the rheostat may alternatively be produced by a mechanical member having a continuously variable aperture disposed between the light source 22 and the lens 30 or between the lens 30 and the copy 14. Several discrete intensity levels may be provided by means of a rotatably mechanical member 33 having a number of circumferentially spaced radial slits 33a as shown in FIG. 2 or a mechanism 35 having holes 35a as shown in FIG. 2 disposed between the light source 22 and the lens 30 or between the lens 30 and the copy 14 to replace the shutter 31.

It is the intention of the invention that the light source 22 and the lens 30 be considered as an integral unit, since the lens 30 may be omitted if the light source 22 produces a sufficiently narrow light beam to illuminate the point on the copy 14. The light source 22 may be of any type, and the switch 26 may be replaced by any means operative to vary the intensity of the point on the copy 14 illuminated by the beam from the light source.

What is claimed is:

1. A method of testing a facsimile transceiver having a transmitter section with a light source to illuminate the copy and a receiver section, the method comprising the steps of:
   energizing both the transmitter section and the receiver section;
   connecting the output of the transmitter section to the input of the receiver section; and
   varying the intensity of the lights source; whereby
   the correlation between the pattern produced by the receiver section and the variation in intensity of the light source is an indication of the normality of operation of the transceiver.

2. A method according to claim 1, in which the intensity of the light source is varied by means of a switch to turn the light source on and off.

3. A method according to claim 2, in which the pattern produced by the receiver section appears in the form of a line on the copy.

4. In a facsimile transceiver having a transmitter section with a light source to illuminate the copy and a receiver section, the improvement of a system to test the transceiver, comprising:
   switch means operative to energize both the transmitter section and the receiver section and connect the output of the transmitter section to the input of the receiver section for testing; and
   means to vary the intensity of the light source; whereby
   the correlation between the pattern produced by the receiver section and the variation of intensity of the light source is an indication of the normality of operation of the transceiver.

5. The improvement of claim 4, in which said means comprises a switch to turn the light source on and off.

6. The improvement of claim 4, in which said means comprises a rotatable mechanical member formed with a plurality of apertures disposed between the light source and the copy.

7. The improvement of claim 5, in which the pattern produced by the receiver appears in the form of a line on the copy.

8. The improvement of claim 4, in which said means comprises a shutter movable to and away from a position between the light source and the copy.

9. The improvement of claim 6, in which the apertures are circumferentially spaced radial slits.

10. The improvement of claim 6, in which the apertures are circumferentially spaced holes.

* * * * *